US008000343B1

(12) United States Patent
Ooe

(10) Patent No.: US 8,000,343 B1
(45) Date of Patent: Aug. 16, 2011

(54) COMMUNICATION DEVICE, AND METHOD OF COMMUNICATION BETWEEN COMMUNICATION DEVICES AND MEDIUM THEREOF

(75) Inventor: Kazuichi Ooe, Kawasaki (JP)

(73) Assignee: Fujitsu, Limited, Kawasaki (JP)

( * ) Notice: Subject to any disclaimer, the term of this patent is extended or adjusted under 35 U.S.C. 154(b) by 0 days.

(21) Appl. No.: 09/501,716

(22) Filed: Feb. 10, 2000

(30) Foreign Application Priority Data

Aug. 18, 1999 (JP) .................................. 11-231694

(51) Int. Cl.
*G06F 15/16* (2006.01)
*G06F 15/177* (2006.01)

(52) U.S. Cl. ...................... 370/465; 709/219; 709/220

(58) Field of Classification Search .................. 370/465, 370/468, 470, 471, 472, 474, 477; 709/220, 709/221
See application file for complete search history.

(56) References Cited

U.S. PATENT DOCUMENTS

| 5,367,522 A * | 11/1994 | Otani ........................... 370/468 |
| 5,448,625 A * | 9/1995 | Lederman .................. 379/88.25 |
| 5,515,373 A * | 5/1996 | Lynch et al. .................. 370/465 |
| 5,579,509 A * | 11/1996 | Furtney et al. .................. 703/27 |
| 5,666,293 A * | 9/1997 | Metz et al. .................... 709/220 |
| 5,719,786 A | 2/1998 | Nelson et al. ................. 709/219 |
| 5,742,499 A * | 4/1998 | Reynolds ........................ 700/2 |
| 5,761,426 A | 6/1998 | Ishizaki et al. ................ 709/221 |
| 5,878,246 A * | 3/1999 | Hildenbrand .................... 703/27 |
| 6,058,312 A | 5/2000 | Kimura ......................... 455/445 |
| 6,178,161 B1 * | 1/2001 | Terry ............................ 370/276 |
| 6,252,900 B1 * | 6/2001 | Liu et al. ....................... 375/219 |
| 6,259,928 B1 * | 7/2001 | Vembu .......................... 455/522 |
| 6,363,260 B1 * | 3/2002 | Achour et al. ............. 455/553.1 |
| 6,421,331 B1 * | 7/2002 | Hulbert ......................... 370/335 |
| 6,504,919 B1 * | 1/2003 | Takagi et al. ............. 379/100.17 |
| 6,574,209 B1 * | 6/2003 | Kosaka ......................... 370/342 |
| 6,603,755 B1 * | 8/2003 | Parker .......................... 370/342 |
| 6,640,115 B1 * | 10/2003 | Fujimoto et al. .............. 455/567 |
| 6,760,311 B1 * | 7/2004 | Raith ............................ 370/252 |
| 2003/0028899 A1 * | 2/2003 | MacInnis ...................... 725/132 |

FOREIGN PATENT DOCUMENTS

| JP | 61-245638 | 10/1986 |
| JP | 05-114913 | 5/1993 |
| JP | 07-066847 | 3/1995 |
| JP | HEI 8-242270 | 9/1996 |
| JP | HEI 8-509847 | 10/1996 |

(Continued)

OTHER PUBLICATIONS

Japanese Office Action for corresponding Japanese Application No. 11-231694 dated Aug. 22, 2006.

(Continued)

*Primary Examiner* — Hassan Phillips
*Assistant Examiner* — Saba Tsegaye
(74) *Attorney, Agent, or Firm* — Staas & Halsey LLP

(57) ABSTRACT

Disclosed are a function of automatically tuning a communication performance between the communications devices connected to a network and a function of periodically confirming and tuning the communication performance. In a plurality of communications devices capable of performing the communications by switching over a plurality of communication modes, the communication performance in each of the communication modes is previously measured under a plurality of communication conditions, there is obtained, per communication condition, a condition-based optimum communication mode as a communication mode in which the communication performance in the specific communication mode exceeds a communication performance in other communication mode, the condition-based optimum communication mode is selected in accordance with the communication condition when in communications, and the communications are thus performed.

10 Claims, 15 Drawing Sheets

FOREIGN PATENT DOCUMENTS

| | | |
|---|---|---|
| JP | HEI 9-62639 | 3/1997 |
| JP | 9-288631 | 4/1997 |
| JP | 10-210105 | 8/1998 |
| JP | 11-164060 | 6/1999 |

OTHER PUBLICATIONS

Notice of Reason for Rejection (Office Action) in corresponding Japanese Patent Application No. 11-231694 dated Mar. 14, 2006.

English Abstract for Japanese Patent Laid-Open Publication No: Hei 09-172430 dated Jun. 1997.

Notice of Reasons for Rejection mailed Apr. 17, 2007, in Japanese application 2005-255564.

"Notice of Reason for Rejection", mailed Jun. 5, 2007, in corresponding Japanese Application No. 11-231694.

\* cited by examiner

FIG. 5

| DATA SIZE (Byte) | | 256 | 512 | 1024 | 2048 | 4096 | 8192 | ... |
|---|---|---|---|---|---|---|---|---|
| COMMUNICATION TIME (mS) | SEND MODE | 21 | 23 | 26 | 28 | 29 | 31 | ... |
| | SEND-GET MODE | 25 | 25 | 26 | 27 | 28 | 29 | ... |

FIG. 7

| DATA SIZE (Byte) | | 256 | 512 | 1024 | 2048 | 4096 | 8192 | 16384 |
|---|---|---|---|---|---|---|---|---|
| COMMUNICATION TIME (mS) | SEND MODE | 21 | 23 | 26 | 31 | 29 | 31 | 31 |
| | SEND-GET MODE | 25 | 25 | 26 | 27 | 28 | 29 | 34 |
| THRESHOLD VALUE | | | | | 2048 (THRESHOLD VALUE "1") | | | 16384 (THRESHOLD VALUE "2") |
| COMMUNICATION MODE | | | | SEND MODE | | | SEND-GET MODE | SEND MODE |

FIG. 8

| DATA SIZE (Byte) | | 256 | 512 | 1024 | 2048 | 4096 | 8192 | 16384 |
|---|---|---|---|---|---|---|---|---|
| COMMUNICATION TIME (mS) | SEND MODE | 21 | 23 | 26 | 31 | 29 | 31 | 31 |
| | SEND-GET MODE | 25 | 25 | 26 | 27 | 28 | 29 | 34 |
| TABLE ENTRY NUMBER | | 0 | ... | ... | 8 | ... | ... | 64 |
| COMMUNICATION MODE | | SEND MODE | | | SEND-GET MODE | | | SEND MODE |

FIG. 12

| DATA SIZE (Byte) | 16000 | 16252 | 16253 | 32000 | 32768 | 65000 | ... |
|---|---|---|---|---|---|---|---|
| MEMORY ALLOCATION EXECUTION TIME (mS) | 2 | 3 | 40 | 63 | 57 | 86 | ... |

FIG. 13

| DATA SIZE (Byte) | 16000 | 16252 | 16253 | 32000 | 32768 | 65000 | ... |
|---|---|---|---|---|---|---|---|
| MEMORY FREE EXECUTION TIME (mS) | 2 | 2 | 63 | 69 | 81 | 104 | ... |

FIG. 16

| DATA SIZE (Byte) | | 256 | 512 | 1024 | 2048 | 4096 | 8192 | ... |
|---|---|---|---|---|---|---|---|---|
| DATA TRNASFERRING/ RECEIVING TIME (mS) | OS BUFFER MODE | 21 | 23 | 26 | 28 | 29 | 31 | ... |
| | DRIVER BUFFER MODE | 25 | 25 | 26 | 27 | 28 | 29 | ... |

COMMUNICATION DEVICE, AND METHOD OF COMMUNICATION BETWEEN COMMUNICATION DEVICES AND MEDIUM THEREOF

BACKGROUND OF THE INVENTION

1. Field of the Invention

The present invention relates to a data communications method and a data communications device for setting optimum communication conditions between the communications devices for performing data communications with each other.

2. Description of the Related Art

A communication speed between communications devices connected to a network depends upon, in addition to a communication performance in terms of hardware in the network, a clock cycle of a CPU incorporated into the communications device, a version of an OS, specifications of a bus connected to the CPU, an accessing speed to a memory from the CPU, and an execution efficiency of a communications driver for actually transmitting and receiving the data by accessing the network. Further, the execution efficiency of the communications driver changes depending on an OS internal function different per version of the OS. The reason is that there might be a case in which the OS internal function for providing the function to a program from the OS changes per version of the OS.

According to the prior art, a performance check is carried out when developing a communications driver, and parameters for exerting an influence upon the execution efficiency are adjusted and set, whereby the execution efficiency of the communications driver is optimized (which is called "tuning").

The parameters set when developed do not necessarily continue to be optimum values due to an OS patch (which may be a partial modification of a so-called load module, i.e., an execution module consisting of a binary file), a change in the CPU, a memory extension, etc.

Further, in such an environment that computer systems (nodes) different from each other are connected to the same network, it is required that the parameters of the communications driver be manually set per node. It is, however, difficult to actually do the manual setting.

SUMMARY OF THE INVENTION

It is a primary object of the present invention, which was devised to obviate the problems inherent in the prior art, to provide a function of automatically tuning a communication performance between communications devices connected to a network.

It is another object of the present invention to provide a function of periodically confirming and tuning the communication performance.

To accomplish the above objects, according to one aspect of the present invention, a communications method of performing communications by switching over a plurality of communication modes comprises followings. The first is a step of measuring a communication performance based on each of the communication modes under a plurality of communication conditions. The second is a step of obtaining, per communication condition, a condition-based optimum communication mode in which the communication performance in the specific communication mode exceeds a communication performance in other communication mode. The third is a step of selecting the condition-based optimum communication mode in accordance with the communication condition when in communications, and thus performing the communications.

According to another aspect of the present invention, a communications method in the plurality of communications devices each having a storage unit and capable of changing a maximum data size as a basis for a data transfer comprises followings. The storage unit of the communications device is operated with a different operation quantity. Then a completion time of the operation is measured. Then a change in the completion time with respect to a change in the operation quantity is obtained. Finally the maximum data size is determined within a range of the operation quantity in which the change in the completion time is within a predetermined value, thus performing the data communications.

A result of this measurement or the maximum data size determined are exchanged between the plurality of communications devices connected to the network, and the maximum data size may also be determined in common between the plurality of communications devices.

According to another aspect of the present invention, a communications device comprises followings. The first is a network driving module for transmitting data to a network and receiving the data from the network. The second is a control module for controlling communications by transferring and receiving the data to and from the network driving module. The third is a plurality of storage areas used for transferring and receiving the data between the network driving module and the control module. The forth is a performance measuring module for measuring a data transferring/receiving time when transferring and receiving data having a different data size between the network driving module and the control module by use of the plurality of storage areas. The fifth is an optimum area obtaining module for obtaining an optimum storage area in which the data transferring/receiving time per data size using the specific storage area is under a data transferring/receiving time per data size using other storage area. The sixth is a selection module for selecting the optimum storage area in accordance with the data size when in communications.

According to still another aspect of the present invention, a readable-by-computer recording medium is recorded with a program for communications by switching over a plurality of communication modes. And the program comprises the following steps. The first is a step of measuring a communication performance in each of the communication modes under a plurality of communication conditions. The second is a step of obtaining, per communication condition, a condition-based optimum communication mode as a communication mode in which the communication performance in the specific communication mode exceeds a communication performance in other communication mode. The third is a step of selecting the condition-based optimum communication mode in accordance with the communication condition when in communications, and thus performing the communications.

According to a further aspect of the present invention, a readable-by-computer recording medium is recorded with a program for communications by temporarily storing storage unit with transfer data restricted to a maximum data size as a basis for a data transfer. And the program comprises the following steps. The first is a step of operating the storage unit with a different operation quantity. The second is a step of measuring a completion time of each operation. The third is a step of obtaining a change in the completion time with respect to a change in the operation quantity. The forth is a step of determining the maximum data size within a range of the operation quantity in which the change in the completion time is within a predetermined value, and thus performing the communications.

As explained above, according to the present invention, the data communications are carried out based on the plurality of communication modes under the plurality of communication conditions between the communications devices connected to the network, and the communication performance in each communication mode under every communication condition, is evaluated. As a result, the optimum communication mode under each communication condition is obtained, and the optimum communication mode is selected based on the communication condition when in communications. Accordingly, the communication performance between the communications devices connected to the network is automatically tuned.

Further, according to the present invention, the completion of the operation when operating the storage unit of the communications device with a plurality of operation quantities is measured. Then the maximum data size in the data communications is determined based on the measured completion time, whereby the communication performance is automatically tuned.

Moreover, according to the present invention, in the case of transferring and receiving the data between the network driving module and the control module; the data having a plurality of data sizes are transferred and received by use of a plurality of storage areas. As a consequence, an optimum storage area is determined, and the optimum storage area used for the transferring and receiving the data is selected based on the data size when in the data communications. Hence, the communication performance is automatically tuned.

The communication performance described above is periodically evaluated, and therefore the communication performance is periodically tuned.

The computer reads the program recorded on the recording medium and executes this program, thereby carrying out the communications method of the present invention and providing a function as the communications device of the present invention.

BRIEF DESCRIPTION OF THE DRAWINGS

FIG. 5 is a diagram showing one example of a result of measuring a communication performance;

FIG. 7 is a diagram showing one example of a result of measuring the communication performance;

FIG. 8 is a diagram showing one example of the result of measuring the communication performance;

FIG. 12 is a diagram showing one example of a result of measuring the communication performance;

FIG. 13 is a diagram showing one example of the result of measuring the communication performance;

FIG. 16 is a diagram showing one example of a result of measuring the communication performance.

DETAILED DESCRIPTION OF THE PREFERRED EMBODIMENTS

Preferred embodiments of the present invention will hereinafter be described with reference to the accompanying drawings.

First Embodiment

Figure 1:
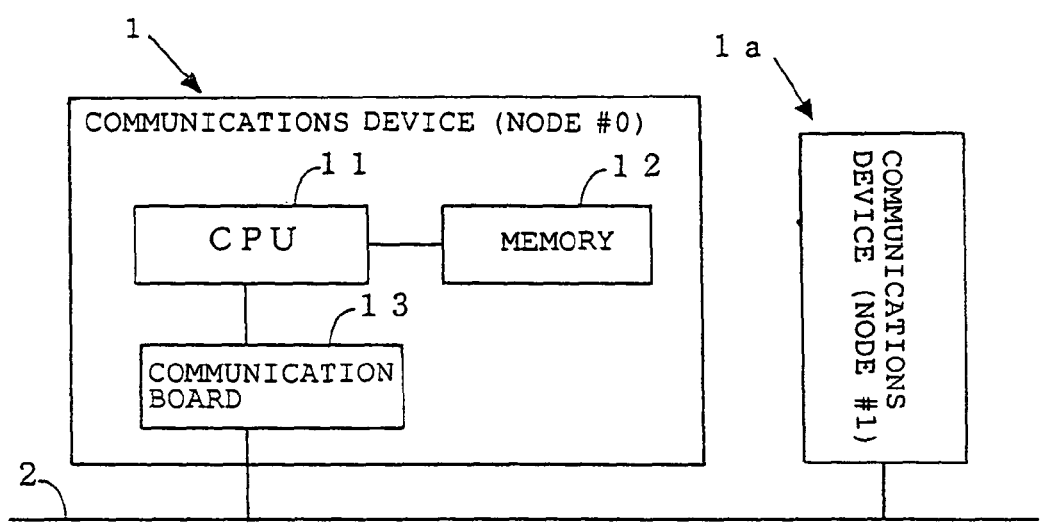
FIG. 1 is an architecture of hardware of a communications device in a first embodiment.
Figure 2:
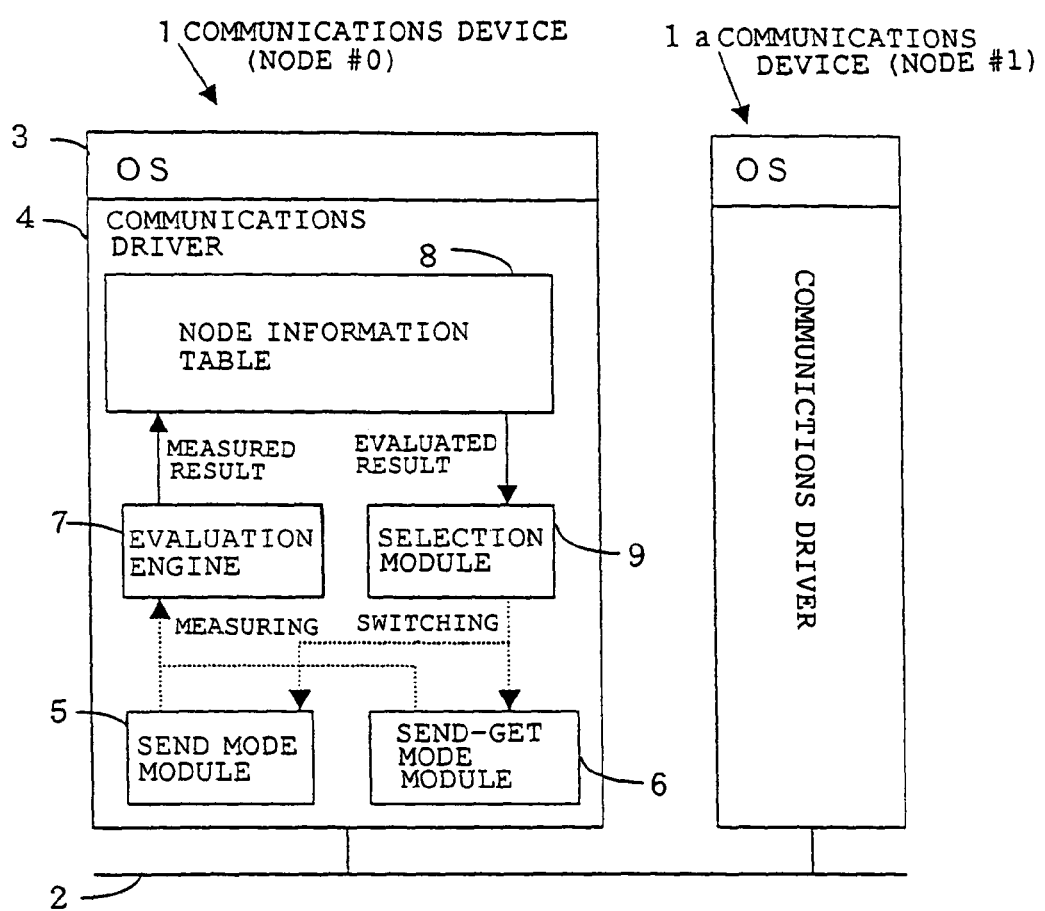
FIG. 2 is a block diagram showing an architecture of a program executed in the communications device in the first embodiment.
Figure 3:
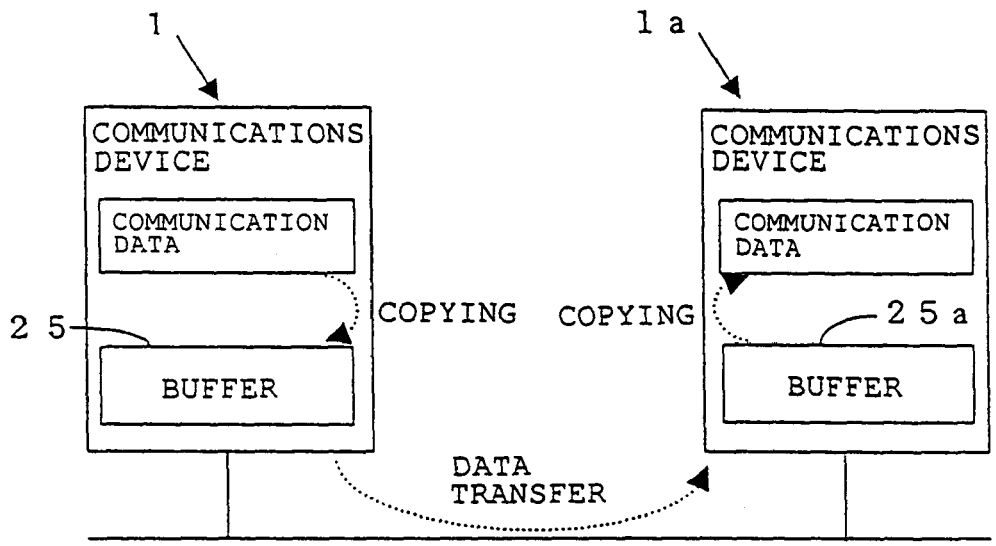
FIG. 3 is a diagram showing one example of a communication mode.
Figure 4:
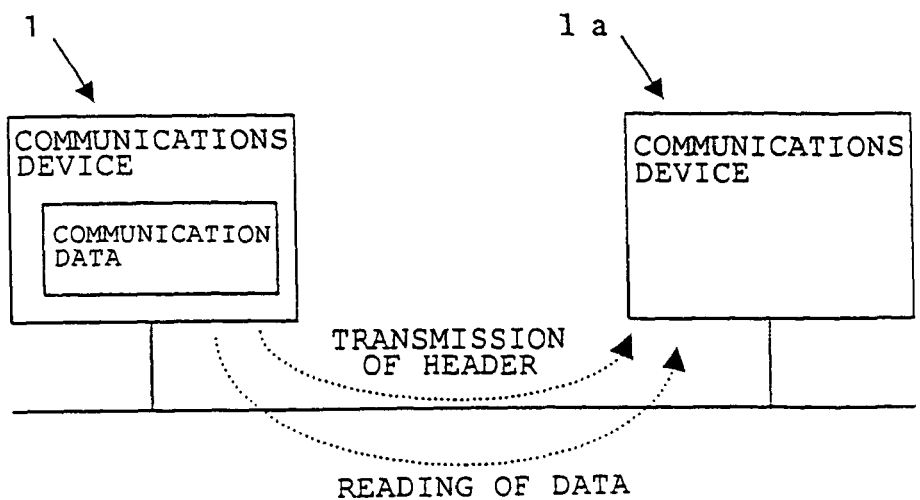
FIG. 4 is a diagram showing one example of a communication mode.
Figure 6:
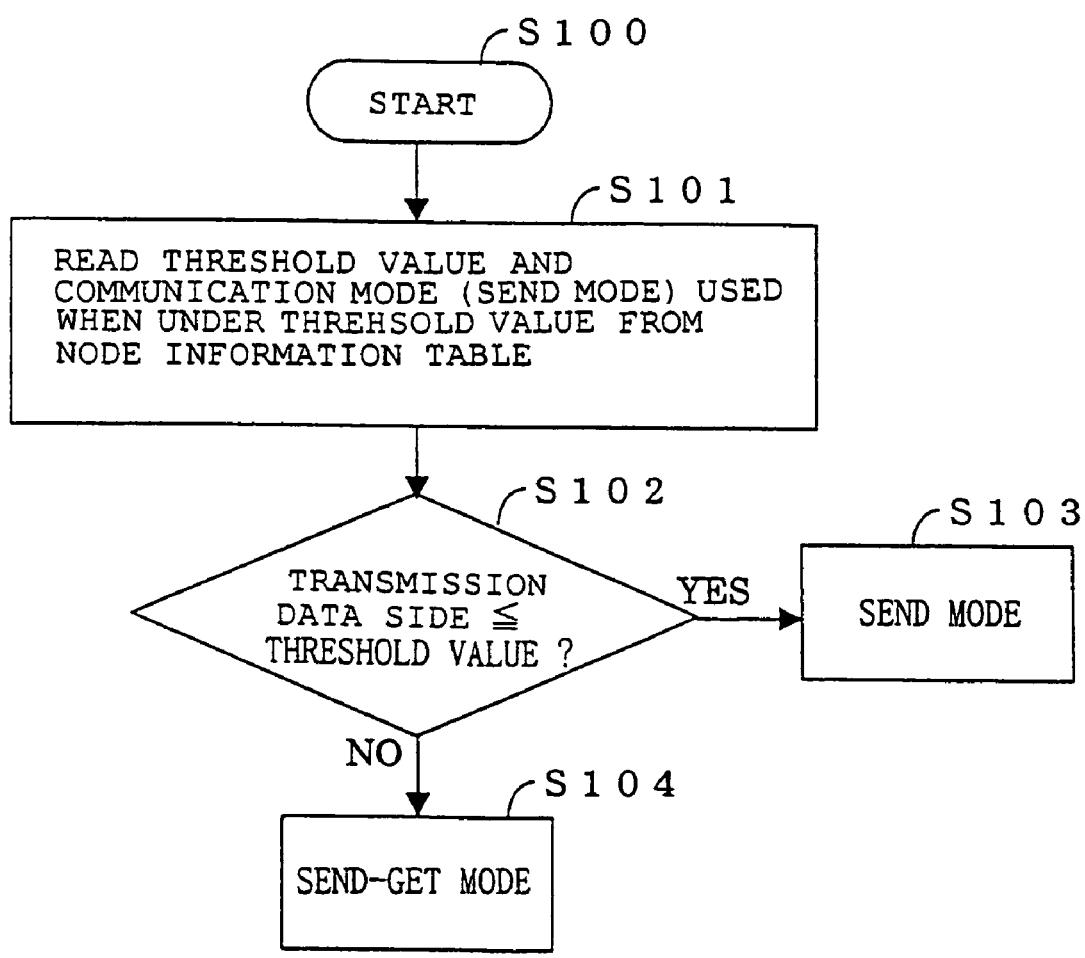
FIG. 6 is a flowchart showing a procedure of selecting the communication mode in the first embodiment.

Referring to FIGS. 1 through 6, a communications device in a first embodiment will be explained. FIG. 1 is a block diagram showing a hardware architecture of the communications device in the first embodiment. FIG. 2 is a block diagram showing a program architecture of the communications device. FIGS. 3 and 4 are diagrams each showing a communication mode between a communications device 1 and another communications device 1a which are illustrated in FIG. 2. FIG. 5 is a chart showing an example of measured results (corresponding to a communications performance) of a communication time between the communications device 1 and the communication device 1a. FIG. 6 is a flowchart showing processes by a communications driver 4 shown in FIG. 2.
<Construction>

FIG. 1 is the block diagram showing the hardware architecture of the communications device 1 in the first embodiment. The communications device 1 includes, a CPU 11, a memory 12 (corresponding to a storage unit) for storing a program executed by the CPU 11 and data used in the CPU 11, and a communications board 13 controlled by the CPU 11 for performing communications with the communications device 1a on a network. The communications device 1 is connected via the communications board 13 to the network 2, and constitutes a node #0 on the network 2. The communications device 1 implements the data communications with the other communications device 1a constituting a node #1 on the network 2.

FIG. 2 is the block diagram showing the architecture of the program executed by the CPU 11 of the communications device 1 in the first embodiment. In the communications device 1, as shown in FIG. 2, the memory 12 has an OS 3 (corresponding to a control module) for controlling the data communications and a communications driver 4 (corresponding to a network driving module) operated by the OS 3.

The OS 3 receives the data from an unillustrated application program executed by the CPU 11 in the data communications with the communications device 1a connected to the network 2. The OS 3 transfers the data to the communications driver 4, and controls the data communications.

The communications driver 4 has a SEND mode module 5 for executing communications based on a SEND mode, a SEND-GET mode module 6 for executing communications based on a SEND-GET mode, an evaluation engine 7 (corresponding to a performance measuring module and a optimum mode obtaining module) for evaluating a communication performance of each of the SEND mode module 5 and the SEND-GET mode module 6, a node information table 8 for storing results of evaluation by the evaluation engine 7, and a selection module 9.

The communications driver 4 accepts a communication request from the OS 3. Based on this communication request, the communications driver 4 transmits the communication data to the network 2 or receives the communication data from the network 2. On this occasion, the communications driver 4 selects any one of the communication modes handled by the SEND mode module 5 and the SEND-GET mode module 6, and transmits and receives the communication data.

The SEND mode module 5 is a module of the communications driver 4, which performs the communications based on the SEND mode. The SEND mode is herein defined as a communication mode of directly transferring, as shown in FIG. 3, the data to the receiving-side communications device 1a from the transmitting-side communications device 1.

On the other hand, the SEND-GET mode module 6 is a module of the communications driver 4, which performs the communications based on the SEND-GET mode. The SEND-GET mode is herein defined as a communication mode in which the receiving-side communications device 1a, as shown in FIG. 4, reads the data from the transmitting-side communications device 1. Therefore, to start with, the transmitting-side communications device 1 transmits only a header of the communication data to the receiving-side communications device 1a, and a data address is designated on the memory 12 in the communications device 1. Subsequently, the receiving-side communications device 1a reads the data from the designated address on the memory 12 of the transmitting-side communications device 1.

According to the SEND mode, the data transfer is completed by one transmitting/receiving process via the network 2. By contrast, the SEND-GET mode requires two transmitting/receiving processes via the network 2. While in the SEND mode, there might occur an extra process of copying the communication data via a transmitting/receiving buffer 25 in the communications drivers 4 or the OSs 3 in the transmitting-side communications device 1 and the receiving-side communications device 1a. By contrast, according to the SEND-GET mode, the communication data are read directly from the memory 12 of the transmitting-side communications device 1 and transferred to the receiving-side communications device 1a. Hence, there occurs no extra process of copying via the communications oriented buffer. Generally speaking, it is therefore difficult to determine which communication mode is more advantageous.

The evaluation engine 7 evaluates communication performances in terms of evaluating a communication time (communication speed) when the SEND mode module 5 and the SEND-GET mode module 6 perform the communications.

FIG. 5 exemplifies evaluation results. FIG. 5 shows one example of the results of measuring the communication time in each of the SEND mode and the SEND-GET mode by varying a data size. Referring to FIG. 5, the communication time based on the SEND mode is shorter than the communication time in the SEND-GET mode till the communication data size is 1024 bytes. With respect to a data size exceeding 2048 bytes, however, the communication time based on the SEND-GET mode is shorter than the communication time in the SEND mode. Such being the case, the communications device 1 (and the communications device 1a) switches the SEND mode and the SEND-GET mode for use.

The data size, i.e., 2048 bytes in this example, serving as a criterion for such a judgement may be called a threshold value. The evaluation engine 7 writes to a node information table 8 both of this threshold value and a communication mode (the SEND mode in the measured result in FIG. 5) that should be used for a data size under the threshold value. A combination of the threshold value and the communication mode which should be used for the data size under the threshold value, corresponds to a condition-based optimum communication mode.

The selection module 9 reads the threshold value measured by the evaluation engine 7 from the node information table 8 as described above, and judges whether or not a communication data size is equal to the threshold value or under. As a result, the selection module 9 selects one of the SEND mode and the SEND-GET mode, thus switching the communication mode.

<Example of Operation>

Next, an example of the operation of the communications device 1 shown in FIG. 2 will be explained. In advance of performing the communications, the evaluation engine 7 of the communications driver 4 judges whether or not the threshold value has already been set for the data communications with the communications device 1a serving as a co-communication node. Therefore, the evaluation engine 7 reads contents of the node information table 8. As a consequence, if the threshold value for the data communications with the communications device 1a is not yet set (viz., the communications device 1 performs the communications with the communications device 1a for the first time), the evaluation engine 7 measures beforehand a time of communications with the communications device 1a as shown in FIG. 5. Then the evaluation engine 7 writes a result of this measurement (a threshold value and data for indicating which communication mode is more advantageous if under the threshold value) to the node information table 8.

Next, the data communications are actually carried out in accordance with the flowchart shown in FIG. 6. To begin with, the selection module of the communications driver 4 reads the threshold value and the communication mode (the SEND mode in the first embodiment) that should be used when under the threshold value from the node information table 8 (step 101 which will hereinafter be abbreviated to S101). Next, the selection module 9 of the communications driver 4 compares a communication data size with the threshold value (S102). If the communication data size is under the threshold value, the communications driver 4 performs the communications in the SEND mode (S103). Whereas if the communication data size is over the threshold value, the communications driver 4 performs the communications in the SEND-GET mode (S104).

Thus, the communications driver 4 automatically selects an optimum communication mode corresponding to the communication condition (which is the communication data size in this case), and hence the communication speed can be increased.

<Modified Example>

In accordance with the first embodiment, there is determined the threshold value for switching the communication mode from the SEND mode to SEND-GET mode and vice versa, and the communication mode is switched over based on whether or not the communication data size is under the threshold value. The threshold value is not limited to one single value. For example, if the result shown in FIG. 7 is obtained as a communication time, the SEND mode communications are more advantageous when the data size is less than 2048 bytes (threshold value 1) than in the SEND-GET mode. Further, if the data size falls within a range of 2048 bytes through 16384 bytes (threshold value 2), the communications in the SEND-GET mode are more advantageous. Moreover, if the data size exceeds 16384 bytes, the SEND mode communications again become more advantageous.

Figure 9:
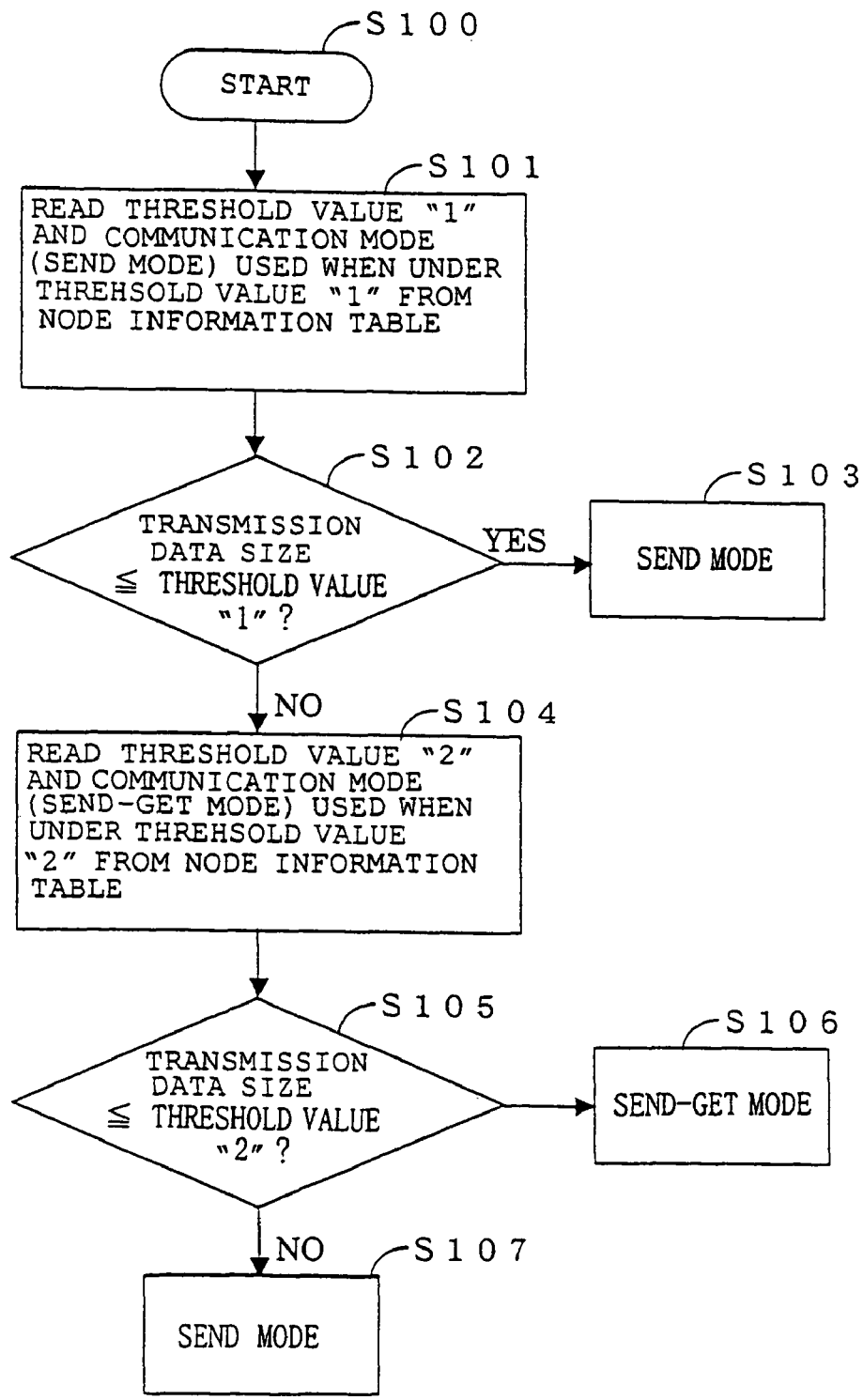
FIG. 9 is a flowchart showing a procedure of selecting the communication mode in a modified example of the first embodiment.

In such a case, as shown in the flowchart in FIG. 9, there are retained a plurality of threshold values for segmenting the data size into a plurality of data fields, and the communication mode may be determined by comparing the communication data size with the plurality of threshold values.

When the number of threshold values increases, in a process of making a plurality of judgements as shown in the flowchart in FIG. 9, the communication speed becomes rather lower due to a processing time for that judgement. This being the case, there is provided a table containing entries each consisting of, e.g., 256 bytes as a basic unit of data size as shown in FIG. 8. Then, in accordance with the following formula (1), the selection module 9 determines which entry the communication data size corresponds to, and may select the communication mode described in the entry indicated by that entry number.

Table Entry Number=Communication Data Size/Data Size Unit (Formula 1)

Figure 10:
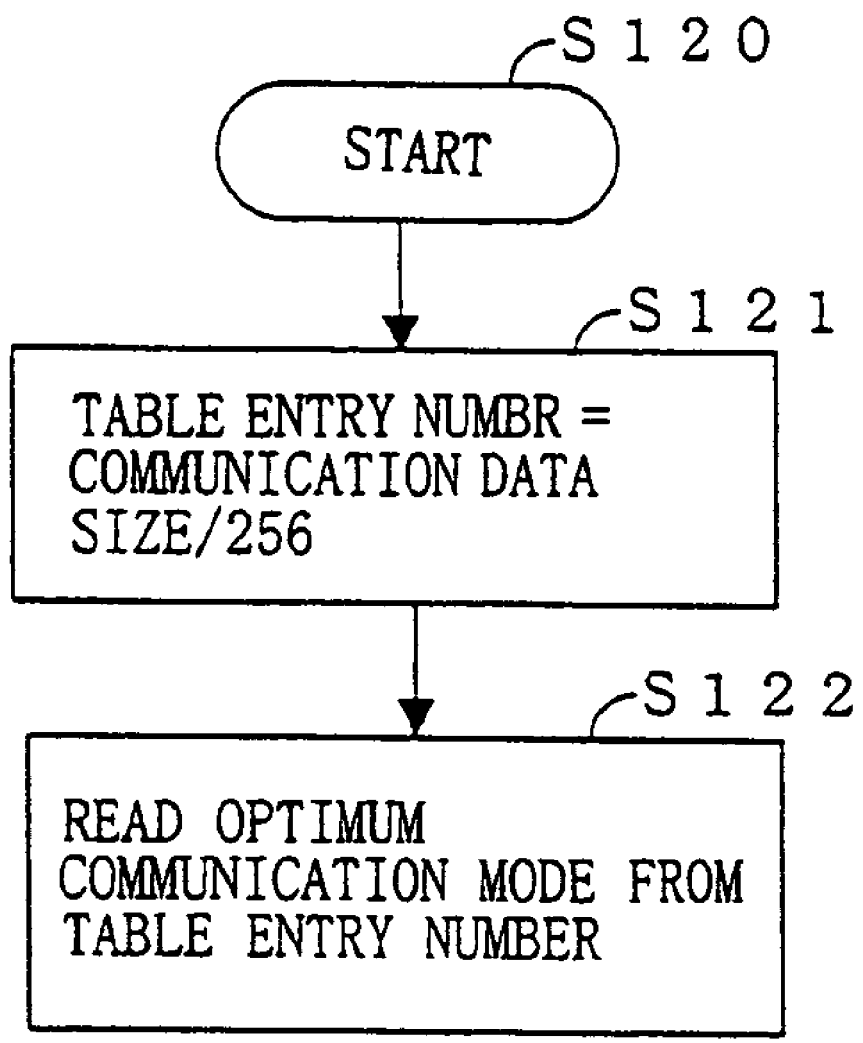
FIG. 10 is a flowchart showing a procedure of selecting the communication mode in a modified example of the first embodiment.

FIG. 10 is a flowchart showing processes based on those entry numbers in that table.

The first embodiment has exemplified the SEND mode communications and the SEND-GET mode communications by way of the communication modes. The embodiments of the present invention are not, however, limited to those communication modes. In short, according to the present invention, at first, the data communications are previously implemented under the plurality of communication conditions between the plurality of communications devices capable of performing the data communications based on the plurality of communication modes, thereby measuring the communication time in each of the communication modes. Next, the communication mode in the actual communications is determined based on the measured result. Accordingly, the present invention is not confined to the communication mode itself.

Further, the communication mode is not restricted to the above two categories in order to carry out the present invention. Namely, if the communication modes for use are written beforehand to the entries in the table as shown in FIG. 8, a communication mode conceived optimal may be selected from three or more communication modes. Then the communications can be performed in this selected mode.

The communications device in the first embodiment uses the communication data size as the communication condition. However, instead of the data size, for instance, a communication time zone, a version of the OS 3 of the communications device 1a as a co-communication node, etc. may also be used as communication conditions. That is, the communication time (or communication speed) is previously measured for the above two communication modes under those communication conditions, and an optimum communication mode is obtained per communication condition. Then, the optimum communication mode may be selected based on the communication condition when effecting the actual communications.

In the first embodiment discussed above, if the threshold value for the data communications with the communications device 1a serving as the co-communication node is not yet set in the node information table 8 (i.e., the communications device performs the communications with the communications device 1a for the first time), the evaluation engine 7 measures the communication performance. Even if the threshold value has already been set, and if there is a time-elapse over a predetermined time from a point of time when the setting has been done, the threshold value may also be set by re-measuring the communication performance. For attaining this, when setting the threshold value, the evaluation engine 7 reads a date and a time thereof from a calendar incorporated into the OS 3 and records these pieces of data in a memory 12. As in the first embodiment discussed above, the communication time (or communication speed) is measured when starting the communications, and it is preferable that the threshold value be set. The communication time (or communication speed) may be, however, measured during the communications.

<Recording Medium Readably by Computer>

The communications driver 4 executed by the CPU 11 in the first embodiment may also be recorded on a recording medium readable by a computer. The communications driver 4 is read and executed by the computer provided with the communication board 13 as shown in FIG. 1, whereby the functions of the communications devices 1, 1a shown in the first embodiment can be provided.

The readable-by-computer recording medium herein embraces recording mediums, readable by the computer, for storing pieces of information such as data and programs electrically, magnetically, optically, mechanically and chemically. Among those recording mediums, what can be removed from the computer may be, e.g., a floppy disk, a magneto-optic disk, a CD-ROM, a CD-R/W, a DVD, a DAT, an 8 mm tape, a memory card, etc.

Further, the recording mediums fixed to the computer are a hard disk, ROM (Read-Only Memory), etc.

<Computer Data Signal Embodied in Carrier Wave>

Further, the communications driver 4 of the communications device 1 is stored in the hard disk or the memory of the computer, and can be distributed to other computers via the communication medium. In this case, the communications driver 4 is transmitted via the communication medium by way of computer data signals embodied in carrier waves. Then, the computer receiving the communications driver 4 can be thereby made to function as the communications device 1 in the first embodiment.

The communication medium herein includes wire communication mediums (an optical communication cable, metallic cables including a coaxial cable and a twist paired cable, etc.), and wireless communication mediums (satellite communications, ground wave wireless communications, etc.).

Further, the carrier wave is categorized as an electromagnetic wave for modulating the computer data signal, and includes the light and a DC signal. Accordingly, the computer data signal embodied in the carrier wave may have a broad-band waveform modulated or a base band waveform unmodulated. That is, the computer data signal takes the base band waveform in the case of utilizing the DC signal having a voltage of 0 as a carrier wave.

Second Embodiment

Figure 11:
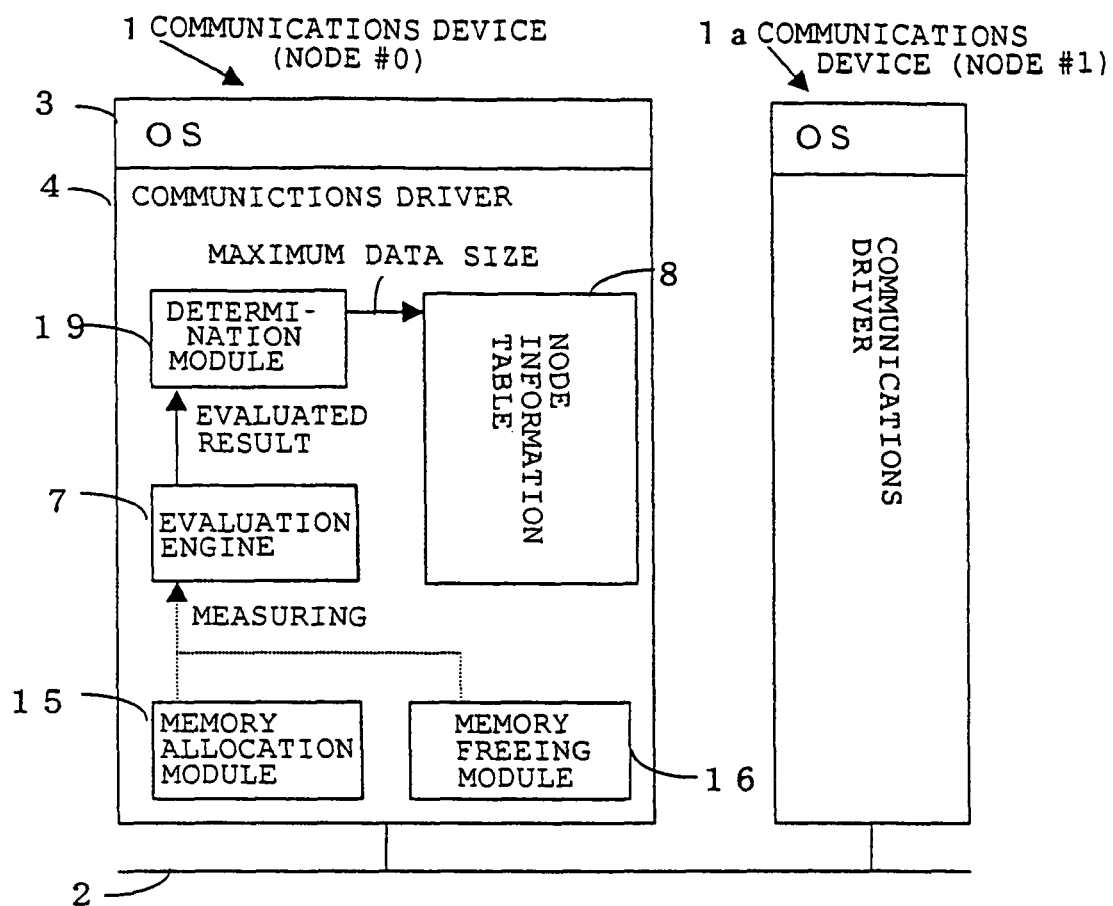
FIG. 11 is a block diagram showing an architecture of a program executed in the communications device in a second embodiment.

A second embodiment of the present invention will be discussed with reference to FIGS. 11 through 13. FIG. 11 is a block diagram showing a program architecture in the communications device in the second embodiment. FIG. 12 shows a result of measuring a time needed for allocating areas on the memory 12 (which is hereinafter termed a memory allocation) in the communications device 1 shown in FIG. 11. FIG. 13 shows a time needed for freeing the areas on the memory 12 (which is hereinafter referred to as memory free) (The memory allocation and the memory free correspond to operating a storage unit).

In the first embodiment discussed so far, the data communications are executed under the plurality of communication conditions between the plurality of communications devices capable of performing the data communications in the plurality of communication modes. And the evaluation engine 7 measures the communication time based on each of the communication time. Then, based on the results thereof, the selection module 9 of the communications device determines the communication mode when in the actual communications. While on the other hand, the second embodiment deals with the communications device capable of varying a maximum data size defined as a basis for transferring the data in the data communications with other communications devices connected to the network 2. The communications device determines the maximum data size as the basis for the data transfer in the data communications, from a time required for the memory allocation and a time needed for the memory free.

The maximum data size as the basis for the data transfer is herein defined as a maximum size of the data transferable when implementing one single data transfer prescribed by the communication protocol as in the case of the maximum packet size in, e.g., Ethernet.

FIG. 11 is the block diagram showing a program of the communications device 1 in the second embodiment. Referring to the block diagram in FIG. 11, the communications driver 4 includes a memory allocation module 15, a memory freeing module 16 (the memory allocation module 15 and the memory freeing module 16 in combination correspond to a storage unit operating module), and a determination module 19 for determining the maximum data size. Other configurations and operations are the same as those in the first embodiment, and hence the same components are marked with the like numerals, of which the explanations are herein omitted. Further, the hardware architecture in the second embodiment is the same as that in the first embodiment, and will be explained referring to FIG. 1.

Referring to FIG. 11, the memory allocation module 15 is executed by the communications driver 4. As a result, a memory area with an allocation size designated on the memory 12 of the communications device 1, is allocated. While on the other hand, the memory freeing module 16 frees a designated memory area segment in the memory area allocated by the memory allocation module 15. The evaluation engine 7 executes the memory allocation module 15 and the memory freeing module 16, and evaluates an execution time thereof. The evaluation engine 7 corresponds to a performance measuring module and a calculation module.

The determination module 19 determines the maximum data size based on this execution time, and writes the maximum data size to the node information table 8. Thereafter, the maximum data size is used as a basis for the data transfer in the communications driver 4. For example, if a data transfer request for data exceeding the maximum data size is given to the communications driver 4, the data in the communications driver 4 is segmented into pieces of data each under the maximum data size, and thus transferred.

FIGS. 12 and 13 show one examples in which the evaluation engine 7 executes the memory allocation module 15 and the memory freeing module 16 and evaluates the execution time thereof. FIG. 12 shows the result of measuring the execution time when the evaluation engine 7 executes the memory allocation module 15 by changing the allocation size on the memory. As shown in FIG. 12, when the allocation size is set to 16253 bytes, the execution time increases by one or more digits as compared with allocation sizes under 16253 bytes.

FIG. 13 shows the result of measuring the execution time by the evaluation engine 7 when the evaluation engine 7 executes the memory freeing module 16 to free the memory area segment allocated by the memory allocation module by varying the allocation size on the memory as described above. When the memory area segment with its allocation size set to 16253 bytes is freed, the execution time also increases by over one digit as compared with the allocation sizes under 16253 bytes, and an execution efficiency sharply declines.

In the communications device 1 in the second embodiment, the determination module 19 obtains an allocation size (16253 bytes in this case) with which the execution time when in such a memory allocation process or memory freeing process discontinuously changes to a deteriorated state, and retains this allocation size in the node information table 8. This may be determined by checking for every execution time whether or not a difference between the execution times changes by a fixed value or larger (or at over a fixed ratio).

This maximum data size is determined when the communications device 1 starts the communications with the communications device 1*a* serving as the co-communication node. In the communications device 1, an operation oriented memory area (buffer area) for communications is allocated owing to the above maximum data size. Therefore, as a result of the setting described above, when performing the communications, the memory allocation and the memory freeing are done with such an allocation size that the execution efficiency does not decline. Accordingly, if the execution time relative to the memory allocation changes depending upon a change in version of the OS 3, a change in the clock cycle of the CPU 11 in the communications device 1, an extension of the memory 12, etc., it is feasible to prevent the concomitant decline of the execution efficiency of the communications driver 4.

<Modified Example>

In the embodiment discussed above, the maximum data size is determined based on the allocation size with which the allocation time or the freeing time changes to the deteriorated state. As a substitute for this method, the maximum data size may be determined based on such an allocation size that both of the allocation time and the freeing time change to the deteriorated state.

In accordance with the embodiment discussed above, the maximum data size is determined when the communications device 1, as explained above, starts the communications with the communications device 1*a* serving as the co-communications node. The maximum data size may also be, however, determined beforehand between the plurality of communications devices connected to the network 2. The maximum data size may be determined so as to be common between the plurality of communications devices 1, 1*a* connected to the network 2. It may be done by exchanging the above-measured execution times for the memory allocation and for the memory freeing in each of the communications devices or the determined maximum data size in each of the communications devices. This common maximum data size may be determined by predetermined methods as a maximum value, a minimum value or an average value of the maximum data size determined in each of the communications devices.

The embodiment discussed above has exemplified the case where the maximum data size as the basis for the data transfer in the communications is determined based on the execution times for the memory allocation and the memory freeing in the communications driver 4. However, the present invention is not limited to this embodiment. Namely, the maximum data size may also be determined based on an execution time for other operations (writing, reading, etc.) with respect to the memory 12.

Further, the embodiment discussed above has exemplified the case where the maximum data size as the basis for the data transfer in the communications is determined based on the execution times for the memory allocation and the memory freeing. Instead of this method, the maximum data size may be determined by a conversion into an execution speed conceived as a memory operation quantity (capacity of the memory allocation, etc.) per unit time, and by detecting a region of the memory operation quantity with which the execution speed discontinuously changes.

In the embodiment discussed above, when the communications device 1 starts the communications with the communications device 1a as the co-communications node, the evaluation engine 7 determines the maximum data size by measuring the execution times for the memory allocation and for the memory freeing. As a substitute for this method, the evaluation engine 7 periodically measures these execution times, and may thus determine the maximum data size. The determination thereof may involve such a process that the timer, incorporated into the OS 3 periodically actuates the evaluation engine 7, and further the evaluation engine 7 starts up the determination module 19.

<Recording Medium Readable by Computer>

The communications driver 4 of the communications device 1 in the second embodiment can be recorded on a readable-by-computer recording medium. The communications driver 4 is read and executed by the computer including the communication board 13 as shown in FIG. 1, thereby providing a function of each of the communications devices 1, 1a shown in the second embodiment.

<Computer Data Signal Embodied in Carrier Wave>

The communications driver 4 of the communications device 1 is stored in the hard disk or the memory of the computer, and can be distributed to other computers via the communication medium. In this case, the program is transmitted via the communication medium by way of computer data signals embodied in carrier waves. Then, the computer receiving the distribution thereof can be thereby made to function as the communications device 1 in the second embodiment.

The computer data signal embodied in the carrier wave may have a broadband waveform modulated or a base band waveform unmodulated (which implies a case of being modulated at a direct current having a voltage of 0).

Third Embodiment

Figure 14:
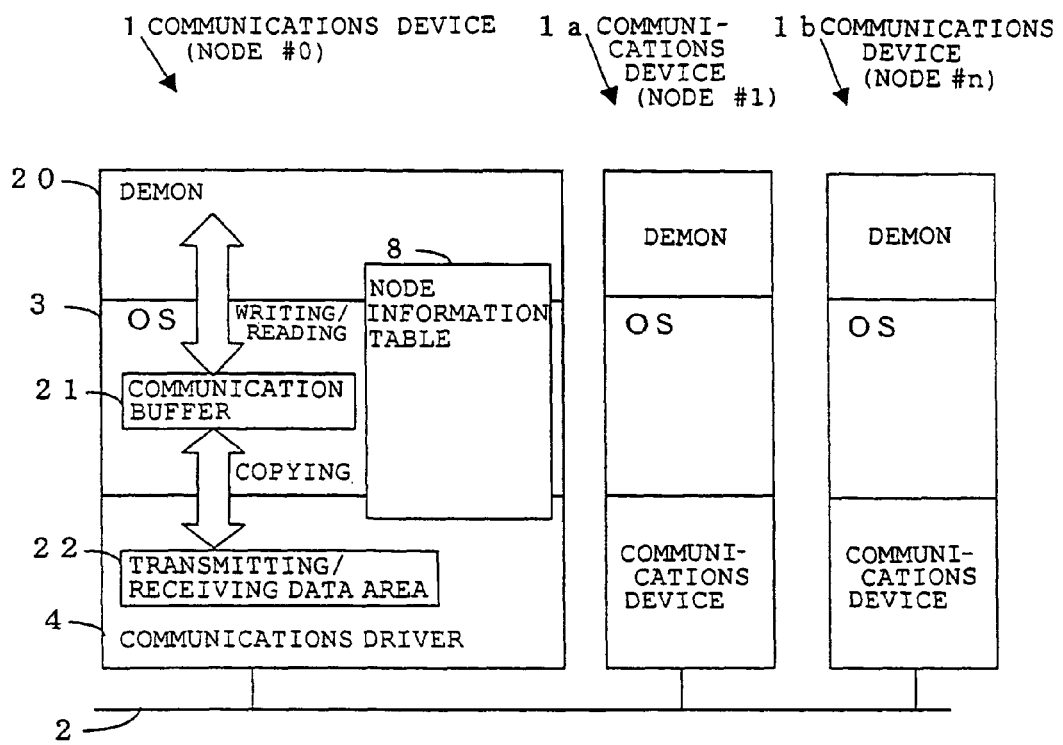
FIG. 14 is a block diagram showing an architecture of a program executed in the communications device in a third embodiment.
Figure 15:
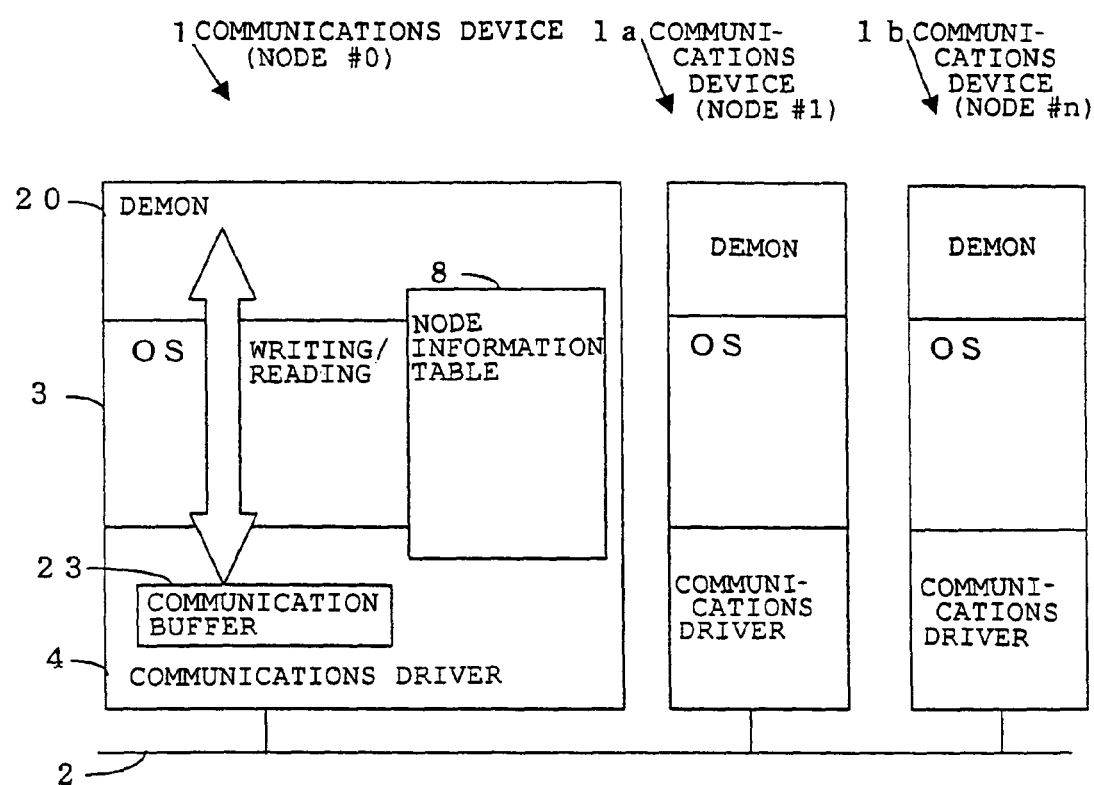
FIG. 15 is a block diagram showing an architecture of a program executed in the communications device in the third embodiment.
Figure 17:
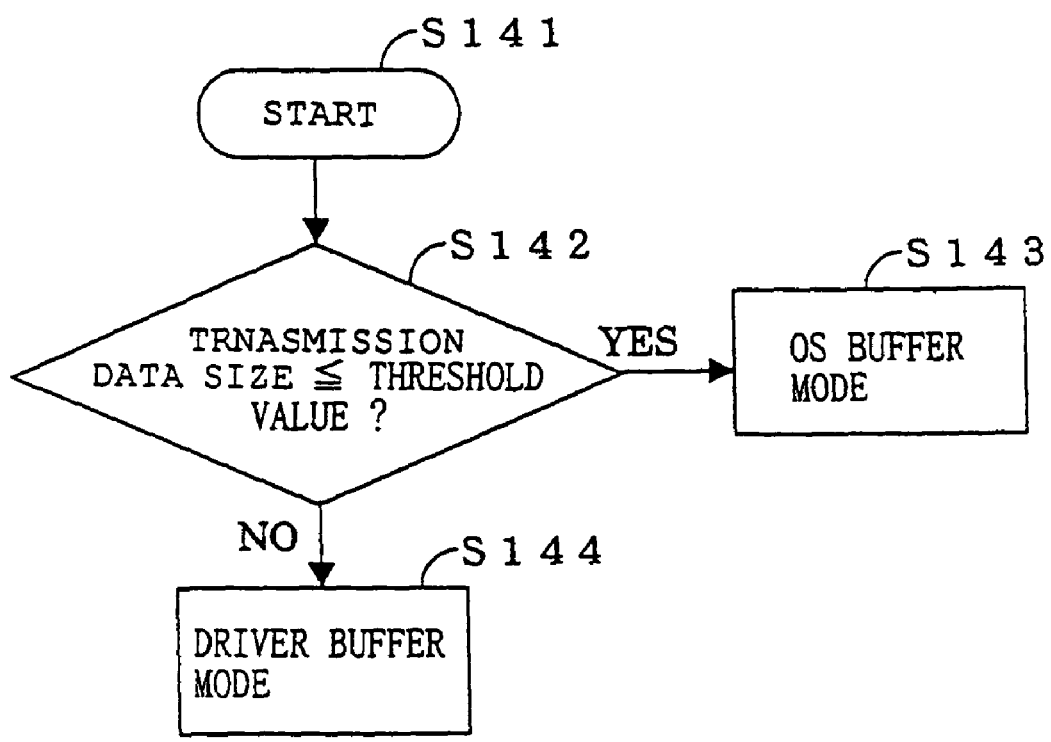
FIG. 17 is a flowchart showing a procedure of selecting a buffer mode in the third embodiment.

A third embodiment of the present invention will be described with reference to FIGS. 14 through 17. FIGS. 14 and 15 are block diagram each showing a program architecture in the communications device in the third embodiment. FIG. 16 shows one example of a result of measuring a data transferring/receiving time between the OS 3 and the communications driver 4 in the communications device 1 illustrated in FIGS. 14 and 15. FIG. 17 is a flowchart showing processes of the OS 3 and of the communications driver 4 illustrated in FIGS. 14 and 15.

In the third embodiment, the communications device 1 for tuning an access to an operation area (buffer area) used when in communications, will be explained.

The communications device 1 shown in FIG. 14 has the memory including a demon defined as an application program for communications with another communications device 1a. Further, the communications device 1 includes a communication buffer 21 serving as an operation area for storing the communication data transmitted and received by the demon 20, and a transmitting/receiving data area 22 serving as an operation area of the communications driver 4. Other configurations and operations are the same as those in the first embodiment, and hence the same components are marked with the like numerals, of which the explanations are herein omitted.

The communication buffer 21 shown in FIG. 14 is provided in a memory area (segmental area on the memory 12) managed by the OS 3. Accordingly, the communications driver 4 copies the data used for the transmission and receipt to the memory area 10 managed by the OS 3, thereby transferring and receiving the data to and from the OS 3. This process is hereinafter be called an OS buffer mode.

On the other hand, a communication buffer 23 shown in FIG. 15 is provided in a memory area (segmental area on the memory 12) managed by the communications driver 4. When transferring and receiving the data between the communications driver 4 and the OS 3, a head address in the communication buffer 23 is transferred to the OS 3, and the data is inputted and outputted by use of the area thereof. This process is hereinafter called a driver buffer mode.

It is recognized that a time required for transferring and receiving the data between the communications driver 4 and the OS 3 (and more essentially a communication time or communication speed) is influenced by buffer structure. The buffers based on the OS buffer mode and the driver buffer mode correspond to a plurality of storage areas.

The demon 20, in a variety of architectures based on the OS buffer mode shown in FIG. 14 and the driver buffer mode shown in FIG. 15, implements the communications with the other communications device 1a via the OS 3 and the communications driver 4 while changing the data size. And the demon 20 measures the communication time (or communication speed) thereof. In the third embodiment, the demon 20 corresponds to a performance measuring module and an optimum area obtaining module. FIG. 16 shows one example of a result of the measurement.

Referring to FIG. 16, if the data size is less than 2048 bytes, the communication time in the OS buffer mode is shorter than in the driver buffer mode. Whereas if exceeding 2048 bytes, the communication time in the driver buffer mode is shorter than in the OS buffer mode. Such being the case, the data size on the order of 2048 bytes may be called a threshold value as in the first embodiment.

The demon 20 obtains the threshold value described above from the result of measuring the communication time as shown in FIG. 16. Then the demon 20 sets in the node information table 8 this threshold value and the buffer mode (the OS buffer mode in the example in FIG. 16) used in the communications for the data size under the above threshold value. A combination of the above threshold value and the buffer mode used in the communications for the data size under the threshold value, corresponds to an optimum storage area.

On the other hand, when performing the communications, the OS 3 and the communications driver 4 determine referring to the node information table 8 whether the OS buffer or the driver buffer should be used corresponding to the communication data size. Then the OS 3 and the communications driver 4 transfer and receive the data to and from each other. FIG. 17 is a flowchart showing a processing procedure of determining the buffer mode in the OS 3 and the communications driver 4. A program (which implies the OS 3 and the communications driver 4 in the third embodiment) for executing the processes in the flowchart shown in FIG. 17 corresponds to the selection module.

The buffer mode exhibiting the shortest communication time (highest communication speed) is thus selected in accordance with the communication condition, and the data communications are carried out between the communications device 1 and the other communications device 1a.

<Modified Example>

As discussed above, the threshold value of the communication data size in the third embodiment is set in the node information table 8, and, based on this threshold value, the OS 3 and the communications driver 4 determine the buffer mode. Instead of this method, the OS 3 (or the communications driver 4) may determine the buffer mode, and the communications driver 4 (or the OS 3) may be notified of a result of this determination.

Note that a plurality of threshold values may also be provided as discussed in the first embodiment. Further, an entry number in the Table may be determined from the communication data size according to the formula 1 in the first embodiment, and the buffer mode for use may be designated in each entry in the Table.

What has been discussed so far in the third embodiment is the communications device for effecting the communications by selecting an optimum buffer mode from the OS buffer mode and the driver buffer mode on the basis of the data size when in the communications. The embodiment of the present invention is not, however, confined to those buffer modes themselves. According to the present invention, the data of plurality of different data sizes are transferred and received via the respective buffers in the communications device capable of using the plurality of buffer modes (or buffer areas). Then the transferring/receiving time thereof is measure beforehand. Then the optimum buffer mode per data size is obtained. Finally, the optimum buffer mode (or buffer area) is selected based on the data size when implementing the communications. Hence, the present invention does not depend upon the buffer mode itself.

The third embodiment has exemplified the method of selecting the optimum buffer mode from the two buffer modes, however, the present invention is not limited to this method. For instance, the present invention can be carried out in the communications between devices capable of using three or more buffer modes. It is done by adopting the method of writing the optimum buffer mode to the entry of a table which is indicated by the entry number calculated from the formula 1 shown in the first embodiment.

<Recording Medium Readable by Computer>

The programs such as the communications driver 4 and the OS 3 or the demon 20 in the communications device 1 in the third embodiment can be recorded on the readable-by-computer recording medium. The program recorded on the recording medium is read and executed by the computer including the communication board 13 as shown in FIG. 1, whereby the function of each of the communications devices 1, 1a shown in the third embodiment can be provided. Incidentally, there is no necessity for recording all the programs such as the communications driver 4 and the OS 3 or the demon 20 on the same medium.

<Computer Data Signal Embodied in Carrier Wave>

The programs such as the communications driver 4 and the OS 3 or the demon 20 in the communications device 1 are stored in the hard disk or the memory of the computer, and can be distributed via the communication medium to other computers. In this case, the program is transmitted via the communication medium by way of computer data signals embodied in carrier waves. Then, the computer receiving the distribution thereof can be thereby made to function as the communications device 1 in the third embodiment.

Herein, the computer data signal embodied in the carrier wave may have the broadband waveform modulated and the base band waveform unmodulated (which implies a case of being modulated at a direct current having a voltage of 0). Note that there is no necessity for distributing all the programs such as the communications driver 4 and the OS 3 or the demon 20 via the communication medium. For example, the communications driver 4 or the OS 3 is recorded on the recording medium, and the demon 20 may be distributed via the communication medium.

What is claimed is:

1. A communication device capable of communicating with a plurality of the other communication devices in different communication modes, the communication device comprising:

a unit that measures performances of a communication between the communication device and one of the other communication device in each of the different communication modes, under the different communication data sizes respectively, for each of the other communication devices;

a unit that determines, for each of the other communication device, a communication data size that a communication performance of a communication between the other communication device in a first communication mode exceeds a communication performance of communication in a second communication mode and set the determined communication data size as a threshold for the other communication device; and a unit that selects one of the communication modes that the corresponding communication performance exceeds the communication performance of the other communication mode in an actual communication under a particular communication data size between a particular communication device under a particular communication condition.

2. The communication device according to claim 1, further comprising:

a table that stores relationship between a communication data size and a communication mode to be selected, for each of the other communication devices, based on a result of the determination, wherein the unit that selects the communication mode refers to, before starting communication with a certain other communication device, the table to select a communication mode that is suitable for a certain communication data size.

3. The communication device according to claim 1, further comprising:

a table that stores the determined communication data size as a threshold value, and a communication mode to be selected for each of the other communication devices, wherein the unit that selects the communication mode refers to the table before starting communication with a certain other communication device, and selects a communication mode for communicating with the certain other communication device by comparing a certain communication data size to the threshold value.

4. A method for optimizing communication condition of a communication between a communication device and other communication device, the method comprising:

communicating, on a same communicating line, with the other communication device in both a first communication mode and in a second communication mode that is different from the first communication mode respectively, under a plurality of different communication conditions;

obtaining communication performances for each of communications with the other communication device;

measuring a communication performance in the first communication mode, and a communication performance in the second communication mode under each of the different communication conditions;

determining, based on the communication performances measured under each of the different communication conditions, a communication condition in which a communication performance of the first communication mode exceeds a communication performance of the second communication mode; and before starting communication with the other communication device in a particular communication condition, selecting, among the first communication mode and the second communication mode, a communication mode corresponding to a particular communication condition and the other communication device, for actually communicating with the other communication device under the particular communication condition, that the communication performance exceeds that of the other communication mode;

storing the determined communication condition, as a threshold, for the other communication device; and referring to the stored threshold when selecting the communication mode to communicate with the other communication device.

5. A method for optimizing communication condition of a communication between a communication device and other communication device, the method comprising:

communicating, on a same communicating line, with the other communication device in both a first communication mode and in a second communication mode that is different from the first communication mode respectively, under a plurality of different communication conditions;

obtaining communication performances for each of the communications with the other communication device;

measuring a communication performance in the first communication mode, and a communication performance in the second communication mode under each of the different communication conditions;

determining, based on the communication performances measured under each of the different communication conditions, a communication condition in which a communication performance of the first communication mode exceeds a communication performance of the second communication mode; and before starting communication with the other communication device in a particular communication condition, selecting, among the first communication mode and the second communication mode, a communication mode corresponding to a particular communication condition and the other communication device, for actually communicating with the other communication device under the particular communication condition, that the communication performance exceeds that of the other communication mode;

storing a relationship between a communication condition and a communication mode to be applied for a communication with the other communication device;

wherein when selecting a communication mode, referring to the stored relationship and determining a communication mode that corresponding to a certain communication condition.

6. A communication method of performing communications between a communication device and other communication device, the method comprising:

communicating with the other communication device to evaluate communication speed, the communication being performed in a plurality of different communication modes respectively, by varying communication data size;

measuring communication speed of each of the communication modes under each of the varied communication data size; and storing into a memory information indicating the measured communication speed of each of the communication modes and corresponding communication data size.

7. The communication method according to claim 6, the method further comprising:

determining a communication data size in which a communication speed in one of the communication modes exceeds a communication speed in the other of the communication modes as a threshold based on the measured communication speed;

wherein information indicating the determined threshold and the communication mode to be selected in accordance with communication data size of an actual communication.

8. The communication method according to claim 7, further comprising:

comparing the threshold stored in the memory and a communication data size of an actual communication to be performed between the other communication device;

selecting, before performing the actual communication, one of the communication modes from the memory based on the result of comparison; and performing the actual communication in the selected communication mode.

9. The communication method according to claim 6, the method further comprising:

determining, for each of the communication data size, a communication mode in which corresponding communication speed exceeds communication speed of the other communication mode;

wherein information indicating correspondence between the determined communication mode and the communication data size is stored into the memory.

10. The communication method according to claim 9, further comprising:

determining communication data size of an actual communication to be performed between the other communication device;

selecting, before performing the actual communication, a communication mode relating to the determined communication data size from the memory; and performing the actual communication in the selected communication mode.

* * * * *

UNITED STATES PATENT AND TRADEMARK OFFICE
CERTIFICATE OF CORRECTION

PATENT NO. : 8,000,343 B1
APPLICATION NO. : 09/501716
DATED : August 16, 2011
INVENTOR(S) : Kazuichi Ooe It is certified that error appears in the above-identified patent and that said Letters Patent is hereby corrected as shown below:

Title Pg, Item (73) (Assignee), Delete "Fujitsu, Limited," and insert -- Fujitsu Limited --, therefor.

Signed and Sealed this
Thirty-first Day of January, 2012

David J. Kappos
*Director of the United States Patent and Trademark Office*